(12) United States Patent
Boland

(10) Patent No.: US 8,307,494 B2
(45) Date of Patent: Nov. 13, 2012

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 575 days.

(21) Appl. No.: 12/548,062

(22) Filed: Aug. 26, 2009

(65) Prior Publication Data
US 2010/0050362 A1 Mar. 4, 2010

(30) Foreign Application Priority Data

Aug. 26, 2008 (EP) .................................. 08162967

(51) Int. Cl.
B60S 1/38 (2006.01)

(52) U.S. Cl. ............ 15/250.43; 15/250.201; 15/250.452

(58) Field of Classification Search ............. 15/250.451–250.454, 250.43, 15/250.44, 250.361, 250.201
See application file for complete search history.

(56) References Cited

U.S. PATENT DOCUMENTS

| 6,675,434 B1 * | 1/2004 | Wilhelm et al. ......... 15/250.454 |
| 2007/0011840 A1 * | 1/2007 | Gilli ......................... 15/250.352 |
| 2007/0204422 A1 | 9/2007 | Machida et al. |

FOREIGN PATENT DOCUMENTS

| DE | 10000373 A1 | 8/2001 |
| DE | 10139104 A1 | 3/2003 |
| EP | 1816041 A | 8/2007 |
| EP | 1857337 | * 11/2007 |

* cited by examiner

Primary Examiner — Gary Graham
(74) Attorney, Agent, or Firm — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, with the special feature that ends of the wiper blade are connected to a respective connecting piece, which windscreen wiper device comprises a connecting device for an oscillating wiper arm, wherein at least one connecting piece comprises engaging members sidewardly engaging the wiper blade from the outside, wherein the engaging members comprise retaining features for retaining the the wiper blade onto the connecting piece.

7 Claims, 2 Drawing Sheets

Figure 1:
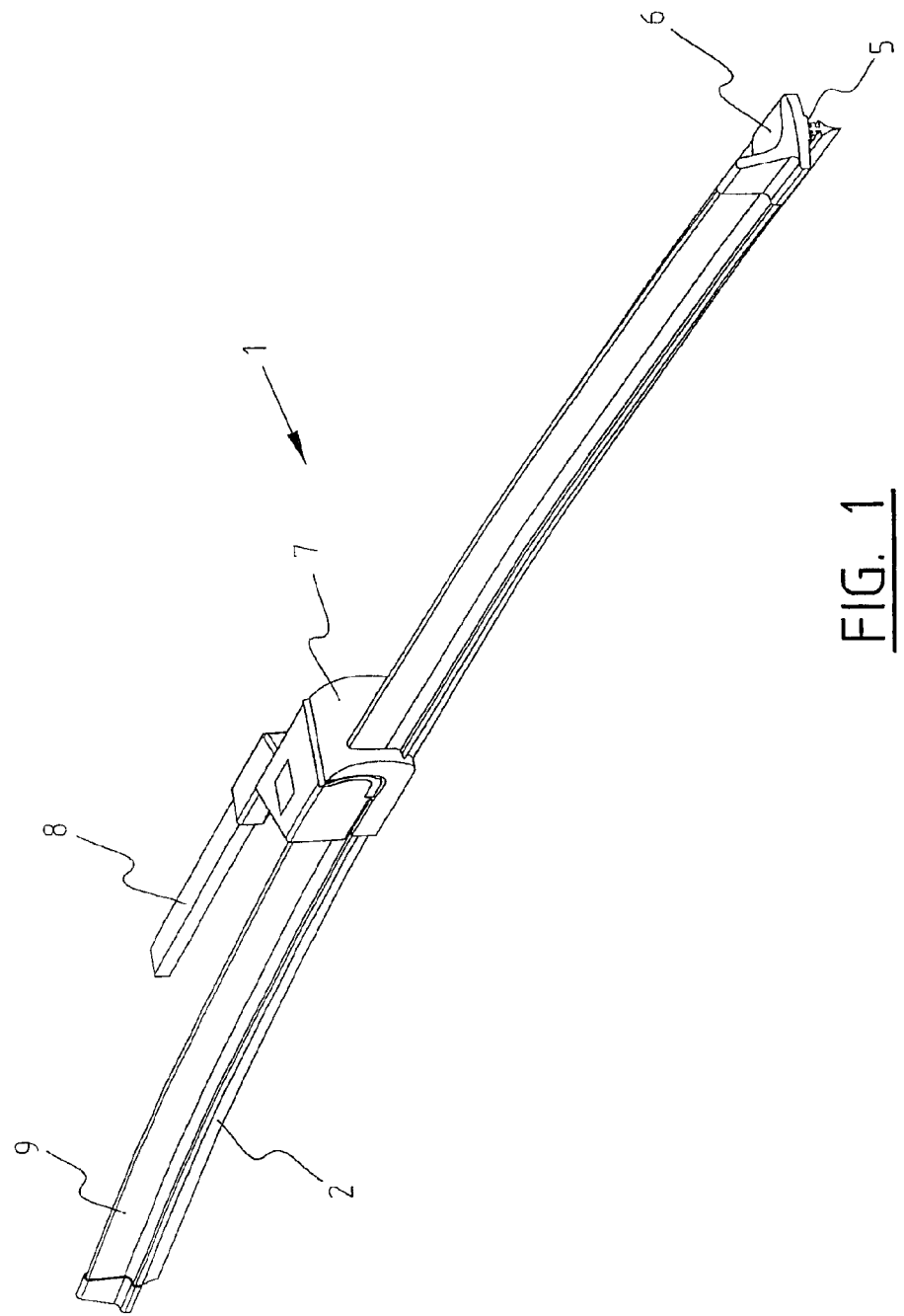

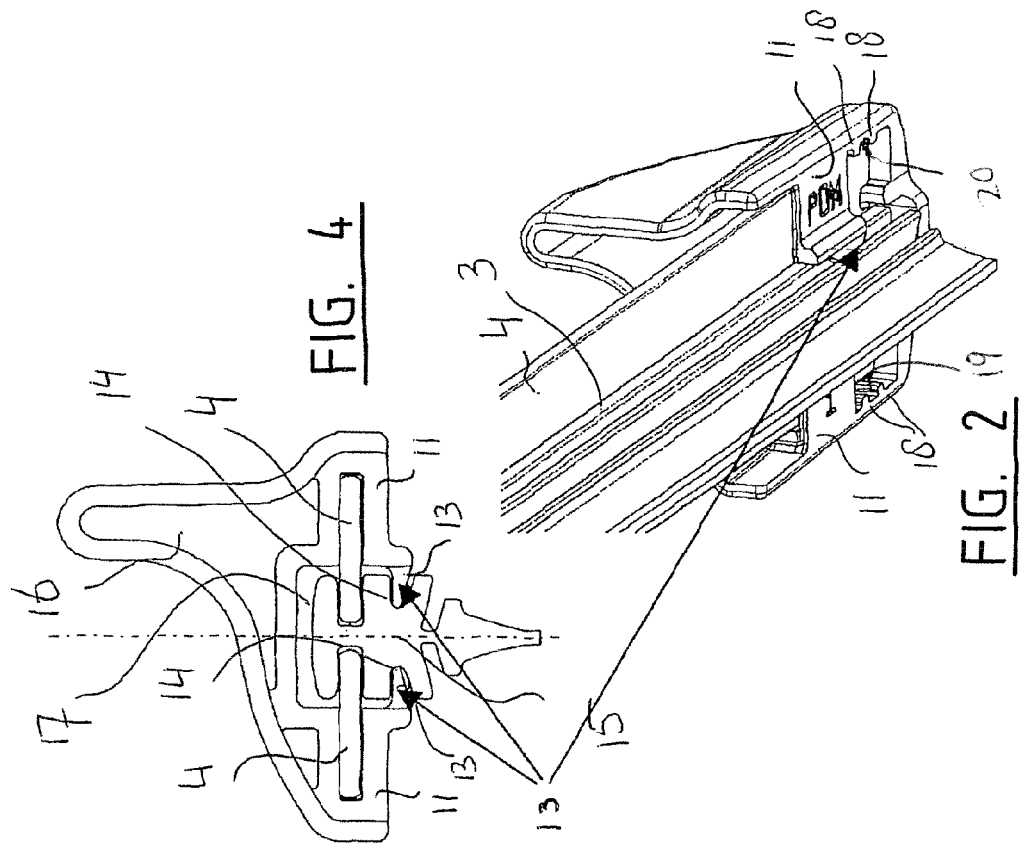
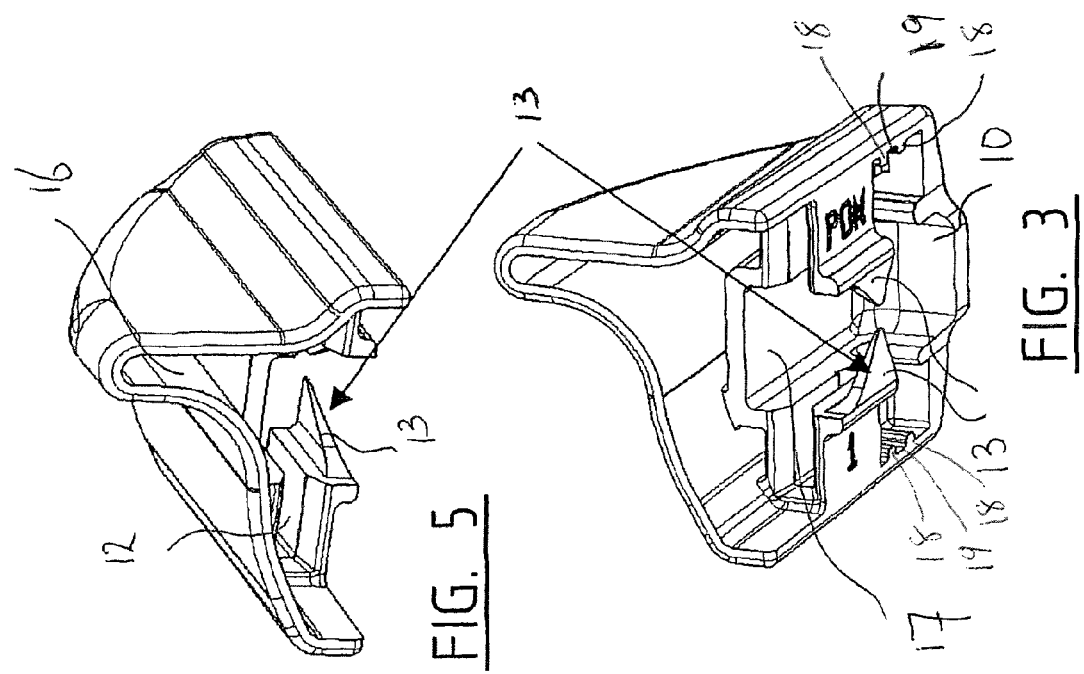

WINDSCREEN WIPER DEVICE

This application claims priority to European Patent Application Serial No. 08162967.7, filed Aug. 26, 2008, and is incorporated herein by reference.

BACKGROUND OF THE INVENTION

1. Technical Field

The invention relates to a windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein ends of the wiper blade are connected to a respective connecting piece, which windscreen wiper device comprises a connecting device for an oscillating wiper arm.

2. Related Art

Such a windscreen wiper device is known form European patent publication no. 1 491 416 in the name of the same Applicant. The prior art windscreen wiper device is in particular designed as a "yokeless" wiper device, wherein use is no longer made of several yokes pivotally connected to each other, but wherein the wiper blade is biased by the carrier element, as a result of which it exhibits a specific curvature. According to the prior art the connecting piece is slid over the neighboring ends of the strips—or vice versa, that is the neighboring ends of the strips are slid into the connecting piece—so that a reliable snap connection between these parts is realized. In the prior art the connecting piece is provided with an opening at its free end so that the wiper blade can freely slide through the connecting piece. In other words, the connecting pieces do not retain the wiper blade, so that the connecting pieces allow a relative movement of the wiper blade along the longitudinal strips in the connecting pieces.

One drawback of the prior art windscreen wiper device is the fact that the connecting pieces (in practice also called "end caps") and the wiper blade are not connected in a durable, solid manner. Particularly, when a spoiler is only retained onto the strips (and not onto an upper part of the wiper blade facing away from the windscreen to be wiped), the wiper blade may come loose from the connecting pieces. As a result, the life span of the prior art windscreen wiper device may be seriously shortened.

SUMMARY OF THE INVENTION AND ADVANTAGES

The object of the invention is to overcome this drawback of the prior art as indicated above, in particular to provide a windscreen wiper device wherein the wiper blade may not come loose from the connecting pieces ("end caps").

In order to accomplish that objective, a windscreen wiper device of the kind referred to in the introduction is characterized according to the invention in that at least one connecting piece comprises engaging members sidewardly engaging the wiper blade from the outside, wherein the engaging members comprise retaining means for retaining the wiper blade onto the connecting piece. During assembly of the present windscreen wiper device the connecting piece and the strips are interconnected particularly with the help of a snap connection, wherein the strips are slid into the grooves formed by the engaging members, and wherein a free end of the part of the wiper blade is slidably mounted in the channel. The retaining means ensure that the free end will stay into the connecting piece at all times. In the alternative the connecting piece is glued or welded onto the strips. Preferably, the connecting piece comprises a channel for a part of the wiper blade that extends from the strip in a direction away from the windscreen to be wiped.

Particularly, wherein the wiper blade includes opposing longitudinal grooves on its longitudinal sides, in which grooves spaced-apart longitudinal strips of the carrier element are disposed, wherein neighbouring ends of the longitudinal strips are interconnected by the connecting piece, and wherein the engaging members engage around the longitudinal strips so that the strips are mounted in grooves formed by the engaging members.

In one preferred embodiment of a windscreen wiper device in accordance with the invention the retaining means engage into opposing longitudinal slits on the longitudinal sides of the wiper blade. Particularly, the retaining means comprises at least one sidewardly extending gripping tooth for gripping an intermediate web of the wiper blade as defined by the opposing longitudinal slits. In case the gripping tooth is in the shape of a hook bent in a direction towards the connecting piece, any movement of the wiper blade in a direction towards the connecting piece may be blocked by an end wall of the connecting piece, whereas any movement of the wiper blade in a direction away from the connecting piece is blocked by the hook. In other words, because the hook and the end wall being preferably present in one connecting piece at one end of the wiper blade are responsible for blockage of the wiper blade in the two directions, the connecting piece at the other end of the wiper blade may have an opening at its free end.

In another preferred embodiment of a windscreen wiper device according to the invention the engaging members and the retaining means are in one piece. Preferably, the engaging members and the retaining means are formed by inwardly bent parts of edges of the connecting piece. The connecting piece is particularly made in one piece of plastic.

In another preferred embodiment of a windscreen wiper device in accordance with the invention (in case the strips at the connecting piece are slidably connected by means of a snap connection comprising laterally extending means on the strips) the laterally extending means comprise at least one protrusion extending laterally from a longitudinal edge of each strip, the protrusion being located between stops on the connecting piece.

In another preferred embodiment of a windscreen wiper device according to the invention the laterally extending means comprise at least two stops extending laterally from a longitudinal edge of each strip, the stops being located on opposite sides of a protrusion on the connecting piece. Particularly, the laterally extending means extend laterally from the interior longitudinal edge of each strip. In the alternative, the laterally extending means extend laterally from the exterior longitudinal edge of each strip.

In another preferred embodiment of a windscreen wiper device in accordance with the invention a spoiler is provided, wherein an end of the spoiler is mounted in the connecting piece. The spoiler is preferably a separate constructional element being entirely detachably connected to the wiper blade, wherein the connecting piece can be slid over the spoiler end.

THE DRAWINGS

The invention will now be explained in more detail with reference to figures illustrated in a drawing, wherein:

FIG. 1 is a perspective, schematic view of a preferred embodiment of a windscreen wiper device according to the invention; and FIGS. 2 through 5 show details of the windscreen wiper device of FIG. 1.

DETAILED DESCRIPTION

FIG. 1 shows a preferred variant of a windscreen wiper device 1 according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6. The windscreen wiper device 1 is further equipped with a connecting device 7 for an oscillating arm 8, and a spoiler 9.

FIG. 2 shows a free end of the windscreen wiper device 1 of FIG. 1, whereas FIG. 3 reveals a bottom view of the free end without the wiper blade 2 being present, both seen in perspective. FIG. 4 is a cross-sectional view of FIG. 2, while figure shows in perspective the connecting piece 6 as a separate constructional element. Corresponding parts have been designated with the same reference numerals. The connecting piece 6 at one end of the wiper blade 2 is closed in the sense that it has an end wall 10 in order to block a relative movement of the wiper blade 2 along the strips 4 inside the connecting piece 6 (in a direction towards the connecting piece 6) during use. The connecting pieces 6 are both made of one piece of plastic.

With reference to FIGS. 2 through 5, each connecting piece 6 is provided with two engaging members 11 made integral therewith, wherein the engaging members 11 engage around the strips 4 so as to form a groove 12 for sliding the strips 4 therein. The engaging members 11 ensure that the strips 4 are blocked against any movement in transversal direction with respect to the connecting pieces 6. Further, the engaging means 11 include sidewardly extending gripping teeth 13 made integral therewith, wherein the gripping teeth 13 grip inside opposing longitudinal slits 14 and into an intermediate web 15 of the wiper blade 2. Hence, the gripping teeth 13 realize that the strips 4 are blocked against any movement in longitudinal direction with respect to the connecting pieces 6. In case the gripping teeth 13 would be hook-shaped, the hooks are preferably bent in a direction away from the connecting device 7, so that any movement of the wiper blade 2 in a direction towards the connecting piece 6 is blocked by the end wall 10 of the connecting piece 6, whereas any movement of the wiper blade 2 in a direction away from the connecting piece 6 is blocked by the hooks. The connecting piece 6 at the other end of the wiper bide 2 may have an opening at its free end, because the connecting piece at the one end of the wiper blade 2 ensures blockage of the wiper blade in the two directions. It is noted that the teeth 12 only slightly penetrates the elastomeric (rubber) material of the wiper blade 2, without damaging the same, namely a part of the wiper blade 2 that extends from the strips in a direction towards the windscreen to be wiped.

Each connecting piece 6 has a cavity 16 to accomodate the free end of the spoiler 9, wherein reference is made to FIG. 4. As can be seen from FIGS. 3 and 4, the connecting piece 6 at one end of the wiper blade 2 comprises a channel 17 for slidably inserting therein the free end of an upper part of the wiper blade 2. In use the upper part extends from the strips 4 in a direction away from the windscreen to be wiped.

With reference to FIGS. 2 and 3, the strips 4 are each provided with laterally extending means in the form of a protrusion 20 extending laterally from a longitudinal exterior edge of the strips 4. When a connecting piece 6 is slidably mounted onto the neighbouring ends 5 of the strips 4, a snap or clicking connection is realized, wherein the protrusions are snapped or clicked between stops 18 ("notches 18") inside the connecting piece 6. Each protrusion rests in a small groove 19 between these opposing stops 18. Accordingly, the strips 4 are blocked against any movement in longitudinal direction with respect to the connecting pieces 6.

The present invention is not limited to the embodiment shown, but extends also to other embodiments falling within the scope of the appended claims.

What is claimed is:

1. A windscreen wiper device comprising an elastic, elongated carrier element, as well as an elongated wiper blade of a flexible elastomeric rubber material, which can be placed in abutment with a windscreen to be wiped, which wiper blade includes opposing longitudinal grooves on its longitudinal sides, in which grooves spaced-apart longitudinal strips of the carrier element are disposed, wherein ends of said wiper blade are connected to a respective connecting piece, which windscreen wiper device comprises a connecting device for an oscillating wiper arm, wherein at least one connecting piece comprises retaining members in the form of at least one pair of sidewardly extending gripping teeth each in the shape of a hook for gripping into an intermediate web of said wiper blade as defined by opposing longitudinal slits of said wiper blade, and wherein said gripping teeth only slightly penetrate the elastomeric rubber material of said wiper blade without damaging said web, and wherein neighboring ends of said longitudinal strips are interconnected by said respective connecting pieces, and wherein engaging members of said connecting pieces engage around said longitudinal strips so that said strips are mounted in grooves formed by said engaging members and wherein one of said connecting pieces at one end of the wiper blade is closed and includes an end wall in order to block a relative movement of the wiper blade along said longitudinal strips inside said connecting piece in a direction towards said connecting piece during use, and wherein the other of said connecting pieces at the opposite end of said wiper blade includes an opening at its free end.

2. A windscreen wiper device according to claim 1, wherein said at least one pair gripping teeth is formed as one piece with said engaging members.

3. A windscreen wiper device according to claim 2, wherein said engaging members and said retaining feature are formed by inwardly bent parts of edges of said connecting piece.

4. A windscreen wiper device according to claim 1, wherein said strips and said connecting piece are slidably connected by means of a snap connection.

5. A windscreen wiper device according to claim 4, wherein said snap connection is provided by at least one protrusion extending laterally from a longitudinal edge of each strip, said protrusion being located between stops on the connecting piece.

6. A windscreen wiper device according to claim 4, wherein said snap connection is provided by at least two stops extending laterally from a longitudinal edge of each strip, said stops being located on opposite sides of a protrusion on the connecting piece.

7. A windscreen wiper device according to claim 4 snap connection comprises laterally extending means extending laterally from the exterior longitudinal edge of each strip.

* * * * *